United States Patent [19]

Nieh et al.

[11] 4,031,138
[45] June 21, 1977

[54] STABLE SUBSTITUTED ACRYLAMIDES OR METHACRYLAMIDES

[75] Inventors: Edward C. Y. Nieh; Philip H. Moss, both of Austin, Tex.

[73] Assignee: Texaco Development Corporation, New York, N.Y.

[22] Filed: Mar. 18, 1976

[21] Appl. No.: 668,171

[52] U.S. Cl. .......................... 260/561 N; 252/426; 260/2.5 AC
[51] Int. Cl.² .................................. C07C 103/133
[58] Field of Search ................. 260/561 N

[56] References Cited

UNITED STATES PATENTS

| | | | |
|---|---|---|---|
| 2,567,836 | 9/1951 | Anthes | 260/561 N |
| 2,595,907 | 5/1952 | Thomas et al. | 260/561 N |
| 3,652,671 | 3/1972 | Barron | 260/561 N |
| 3,661,868 | 5/1972 | Barron | 260/561 N |
| 3,666,810 | 5/1972 | Hoke | 260/561 N |
| 3,671,472 | 6/1972 | McNamee et al. | 428/511 |
| 3,878,247 | 4/1975 | Moss | 260/561 N |

FOREIGN PATENTS OR APPLICATIONS 2,008,643   9/1970   Germany

OTHER PUBLICATIONS

Erickson, J. Am. Chem. Soc. 74(1952), pp. 6281–6282.

Primary Examiner—Arthur P. Demers
Attorney, Agent, or Firm—James L. Bailey; Carl G. Ries; Thomas H. Whaley

[57] ABSTRACT

Covers a new composition of matter comprising a stable N-(ω-monoalkylaminoalkyl) acrylamide or methacrylamide monomer characterized by the following structural formula:

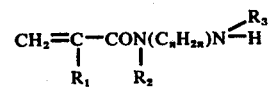

where $R_1$ and $R_2$ are hydrogen or methyl, $R_3$ is isopropyl or t-butyl and n is 2 or 3, with the proviso that when $R_1$ is hydrogen, $R_3$ is t-butyl. Also covers a method of preparing said monomer by condensing one mole of an acrylic or methacrylic compound with two moles of an appropriate amine to form an intermediate substituted amide, followed by heating said intermediate to split off one mole of reactant diamine leaving the desired substituted aminoalkyl acrylamide or acrylamide monomer.

11 Claims, No Drawings

STABLE SUBSTITUTED ACRYLAMIDES OR METHACRYLAMIDES

BACKGROUND OF THE INVENTION

1. Field of the Invention

This invention relates to novel stable acrylamide or methacrylamide monomers and their method of preparation.

2. Description of the Prior Art

U.S. Pat. No. 2,451,436 relates to N-alkyl acrylamides and their method of preparation. Likewise, the article in JACS 74, 6281 (1952) by J. G. Erickson is concerned with the preparation and stability of beta-dialkylacrylamides and also sets out the synthesis of N,N-dialkylacrylamides prepared therefrom.

However, to date there has been no method described of preparing stable primary or secondary aminoalkyl acrylamides or methacrylamides existing in free base form. Said stable monomers in base form are unknown in the art.

SUMMARY OF THE INVENTION

The invention relates to stable N-($\omega$-monoalkylaminoalkyl) acrylamide or methacrylamide monomer characterized by the following formula:

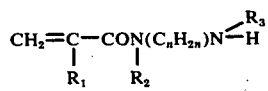

where $R_1$ and $R_2$ are hydrogen or methyl, $R_3$ is isopropyl or t-butyl and $n$ is 2 or 3 with the proviso that when $R_1$ is hydrogen, $R_3$ is t-butyl. These stable monomers may be prepared by condensing one mole of an acrylic or methacrylic compound having the structure:

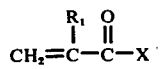

where $R_1$ is hydrogen of methyl and X is selected from the group consisting of halo, OH, or —$OR_4$ where $R_4$ is lower alkyl, with a diamine having the structure:

where $R_2$ is hydrogen or methyl, $R_3$ is isopropyl or t-butyl and $n$ is 2 or 3 to provide an intermediate compound having the structure:

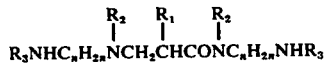

where $R_1$, $R_2$, $R_3$, and n have a significance as above defined, and heating said intermediate compound at a sufficient temperature to split off one mole of said reactant diamine to yield said N-($\omega$-monoalkylaminoalkyl) acrylamide or methacrylmide. When acrylic acid is an initial reactant, $R_3$ in the above formula is t-butyl.

DESCRIPTION OF THE PREFERRED EMBODIMENTS

The invention relates to the synthesis of the above described N-($\omega$-monoalkylaminoalkyl) acrylamides or methacrylamide monomers. To prepare these materials there is first provided an acrylic or methacrylic compound having the structure:

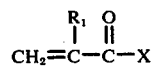

where X is halo, OH or —$OR_4$ is lower alkyl, with $R_1$ being hydrogen or methyl. The acrylic or methacrylic compound may be in acid ester or acid halide form. When the acid halide is employed it is preferred that the acid chloride be utilized such that X is chloro. When the ester form is utilized it is greatly preferred that the methyl or ethyl ester be used as a reactant.

The above acrylic or methacrylic compounds are reacted in at least a 1:2 mole ratio with a diamine having the structure:

where $R_2$ is hydrogen or methyl, $R_3$ is isopropyl or t-butyl and $n$ is 2 or 3. When acrylic acid is employed as a reactant, $R_3$ is t-butyl. In a preferred embodiment the diamine reactant is present in an excess over the theory required of 2 moles of diamine per mole of acrylic or methacrylic reactant. More preferably, 2-3 moles of diamine is reacted per mole of acrylic or methacrylic compound. Most preferably, the mole ratio of diamine to acrylic or methacrylic compound is 2.2–2.6 moles:mole.

In the first step of the process of the invention one mole of the amine reacts across the double bond with the other mole amidifying the acrylic or methacrylic compound. This first step of condensation may take place over a wide range of time and temperature conditions depending upon the particular reactants involved and other variables. Generally, the reaction is complete in ½–24 hours, more often 1–10 hours. Usually the temperature of reaction is 150°–190° C, and the reaction itself is effected under a pressure of 1–20 atmospheres. The reaction may be carried out in presence or absence of solvent. When a solvent is present it should be unreactive with both the reactants and products. Preferred solvents when utilized, are those which assist the condensation reaction by forming an azeotrope with the water of condensation, facilitating removal of this water. The reaction is thereby driven to completion in a relatively short time. Solvents of this type include toluene, benzene, xylene, etc. as well as aliphatics, halogenated aromatics and high boiling ethers, etc.

An intermediate compound is then prepared in the condensation step as follows:

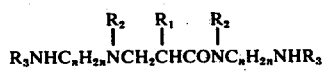

where $R_1$, $R_2$, $R_3$, and n have a significance as above defined. This intermediate compound is then heated at a sufficient temperature to split off one mole of the reactant diamine to yield the desired N-($\omega$-monoalkylaminoalkyl) acrylamide or methacrylamide. The monomeric product so formed by splitting off one mole of diamine has been found to be stable in the free base form. This second step in the process of the invention is usually carried out again over a wide range of time and temperature variables. Usually this heat step or pyrolysis is effected under vacuum at a high temperature relative to the temperature of condensation in the first step of the reaction. Usually the pyrolysis is complete in ¼–10 hours and more often ½–5 hours. The usual temperature range is 180°–280° C. under vacuum conditions of 1–75 mm.

After completion of the pyrolysis reaction the desired monomer is recovered from the pyrolysis overhead. The acrylamide or methacrylamide monomers are separable from the diamine by various means such as by subsequent fractionation of the co-distilled product.

It was surprising to discover that certain N-(ω-secondary aminoalkyl) acrylamides and methacrylamides could be prepared in good yield which were stable upon storage under ambient conditions in free base form. First, from prior art work one would believe that such materials would be unstable due to predicted addition of the amino group to the double bond in a form of a Michael addition. Thus, such instability by reason of conversion of the secondary aminoacrylamides or methacrylamides to substituted poly(beta-alanines) would be illustrated by the following reaction scheme:

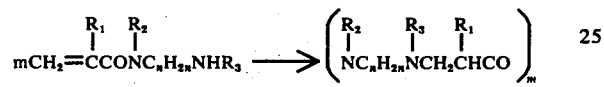

where $R_1$ and $R_2$ are hydrogen or methyl, $R_3$ is lower alkyl, $n$ is two or three, and $m$ is some higher integer. However, surprisingly the specific monoalkyl aminoalkyl acrylamide or methacrylamides in free base form falling within the scope of the disclosure here are stable.

It is also noteworthy to point out that the prior art is replete with instances where the acylation of monosubstituted diamines proceeds via ring closure to imidazolines and tetrahydropyrimidines rather than to the alkyl aminoalkylamides. Cyclization reactions of this type are disclosed in the following articles: "Imidazole and Its Derivatives, Part I," A. Weissberger, pp. 213–243, Interscience, New York, N.Y. (1953); "The Pyrimidines, Supplement I," A. Weissberger, pp. 331–333, Wiley-Interscience, New York, N.Y., (1971); JACS 1939, 822–4; A. J. Hill and S. R. Aspinall; JACS 1939; 3195–7, S. R. Aspinall; JACS 1948, 1629–1632, J. L. Riebsomer; and J. Org. Chem., 1947, 577–586, Al Kyrides et al. It was particularly interesting to note that even when a hindered alkylene diamine was employed such as in the Riebsomer work nevertheless imidazolines were still the favorite product.

Other compounds closely related to those described here were attempted to be synthesized. However, in many instances they could not be prepared or the resultant monomers were unstable.

Typical compounds includable within the scope of the invention are the following:

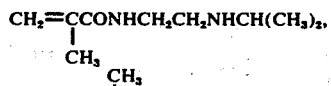
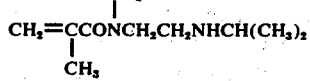
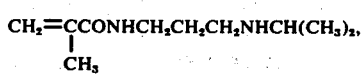

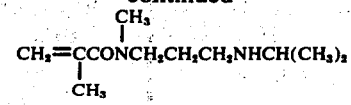
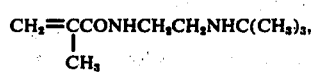
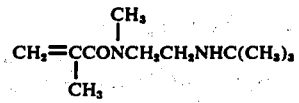
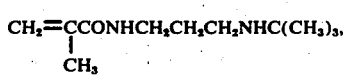
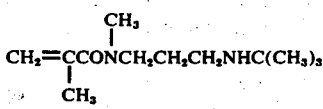
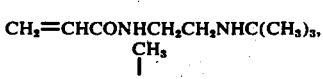
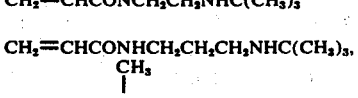

The following examples illustrate preparation of typical compounds falling within the scope of the invention. It is understood that the examples are merely illustrative and that the invention is not to be limited thereto.

EXAMPLE 1

Methacrylic acid (516 g., 6 moles) and 3-isopropylaminopropylamine (1715 g., 15 moles) were reacted in a stirred autoclave at 175° C for 2 hours. The resulting mixture was transferred to a three liter, three neck, round bottom flask equipped with thermometer and distillation column topped with a take-off head. Over a 2 hour period the pot temperature was brought to 175° C while about one equivalent of water was distilled and collected. The pot temperature was held at 175° C for an additional two hours. The excess 3-isopropylaminopropylamine was recovered as an overhead product (341 g., B.P. 55°/7 mm.). During the distillation the pot temperature was not allowed to exceed 150° C. The pot residue, 1698 g., consisted of N-isopropylaminopropyl methacrylamide (10 ± 3%) and the substituted propionamide (I) (85 ± 5%).

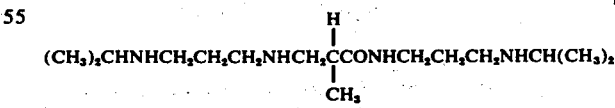

The pyrolysis of this bottoms product was conducted in a 500 ml., three neck flask equipped with thermometer, feed line and distillation column topped with take-off head. An initial charge of 250 g. of feed and 1 g. of N,N'-diphenylphenylenediamine was brought to 230° ± 20° C at 30 mm. pressure. The pyrolysis products, N-isopropylaminopropyl methacrylamide and 3-isopropylaminopropylamine, were codistilled at 160° ± 15° C/30 mm. Additional feed, inhibited by 1000 ppm of N,N'-diphenylphenylenediamine, was added continuously at 200 ± 20 g./hour, matching the overhead production rate. When 1,540 g. of feed had been charged, the feed line was closed but pyrolysis was continued until only 30–40 g. of material remained in the pot. A total of 1515 g. of distillate was collected. The yield of N-isopropylaminopropyl methacrylamide, b.p. 126°–128° C/1 mm., was 85% of theoretical, based on methacrylic acid.

EXAMPLE 2

Methyl methacrylate (35 g., 0.35 mole) and 3-isopropylaminopropylamine (125 g., 1.10 mole) were reacted at 175° C for 2 hours in a rocking autoclave. Following removal of excess 3-isopropylaminopropylamine by distillation at 50 mm., 150° C maximum pot temperature, the bottoms were pyrolyzed at 240° ± 10° C at 50 mm. in a flask equipped with a column and take-off head. The collected reaction products, 79 g., were co-distilled at 165° ± 10° C. as formed. Subsequent fractionation recovered 3-isopropylaminopropyl amine and N-isopropylaminopropyl methacrylamide, 47 g., 72% based on methyl methacrylate.

EXAMPLE 3

By a procedure similar to that of Example 2, methyl methacrylate, 70 g., and 3-tert-butylaminopropylamine, 240 g., were reacted and the corresponding condensation products pyrolyzed. From the pyrolysis overhead were recovered 3-tert-butylaminopropylamine and N-tert-butylaminopropyl methacrylamide, b.p. 122°–123°/0.25 mm., 107 g., 84% of theoretical based on methyl methacrylate.

EXAMPLE 4

Using a procedure similar to that of Example 2, methyl methacrylate (600 g., 6 moles) and N-methylaminopropylamine (1500 g., 17.5 moles) were reacted to give 1307 g. of a condensation product after removal by distillation of methanol and excess diamine. Analysis of this residue by NMR indicated it to be a mixture of substituted propionamides (II) and (III):

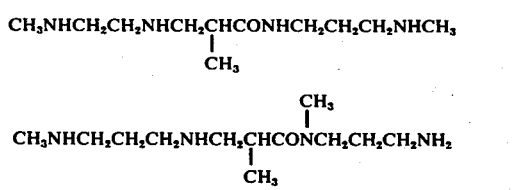

Part of the condensation product, 1210 g., was pyrolyzed at 200° to 220° C. under 45 mm.Hg. pressure. The pyrolysis product, 1026 g., was collected at 135° ± 5° C. Fractionation of 761 g. of this material provided the following distillation cuts.

| Fraction | B.P., °C. | Pressure, mm. | G. |
|---|---|---|---|
| 1 | 55–8 | 3 | 91 |
| 2 | 58–75 | 3 | 104 |
| 3 | 75–86 | 3 | 40 |
| 4 | 86–105 | 4 | 39 |
| 5 | 105–113 | 4 | 42 |
| 6 | 113–119 | 4 | 54 |
| 7 | 119–120 | 4 | 45 |
| 8 | 115–120 | 4 | 28 | spectral analysis by IR and NNR indicated that these cuts are mixtures of 1,2-disubstituted tetrahydropyrimidine derivatives, N-methylaminopropyl methacrylamide and N-aminopropyl-N-methyl methacrylamide and their Michael condensation derivatives.

EXAMPLE 5

Methacrylic acid (25 g., 0.68 mole) and isopropylaminoethylamine (68 g., 0.28 mole) were reacted at 175° to 180° C. for 3 hours in a 250 ml., 3-neck flask equipped with distillation means. During the reaction approximately one equivalent of by-product water was taken overhead. The bottoms product was pyrolyzed as described in Example 1. From the pyrolysis overhead product was recovered by distillation isopropylaminoethyl methacrylamide (22 g.), BP 127° C. and 11 mm. Hg pressure. As indicated by NMR analysis, isopropylaminoethyl methacrylamide is stable for at least two weeks at room temperature.

EXAMPLE 6

By a procedure similar to that of Example 1, acrylic acid, 150 g., and 3-tert-butylaminopropylamine, 670 g., were reacted and three-quarters of the resulting condensation product pyrolyzed at 230° C. and 50 mm. pressure. The pyrolysis reaction yielded two major fractions: a 254 g. fraction, BP 150°–164° C., at 50 mm. and a 170 g. fraction, BP 180°–184° C. From the higher boiling fraction, was recovered by distillation tert-butyl-aminopropylacrylamide, BP 125°–127° C. at 0.25 mm., 133 g. The stability of tert-butylaminopropylacrylamide was confirmed by NMR analysis of a 25% solution of tert-butylaminopropylacrylamine in deuterated chloroform over a period of three weeks.

EXAMPLE 7

By a procedure similar to that of Example 1, acrylic acid, 288 g., and isopropylaminopropylamine, 1140 g., were reacted and the resulting condensation produce pyrolyzed at 230° C. and 50 mm. Hg pressure. Fractionation of the pyrolysis overhead product provided the following cuts:

| Cut | BP | Pressure | g. |
|---|---|---|---|
| 1 | 35° C | 0.25 | 295 g. |
| 2 | 35–70° C. | 0.25 | 45 g. |
| 3 | 60–110° C. | 0.25 | 24 g. |
| 4 | 110° C. | 0.25 | 35 g. |
| Pot residue | | | 254 g. |

Cut 4 was analyzed by NMR spectroscopy after it had stood at room temperature overnight. The result indicated that the sample was a polymeric alanine derived from isopropylaminopropylacrylamide with almost complete absence of monomer. Thus, it can be seen that with respect to the above formula defining the products of the invention, that when $R_1$ is hydrogen, $R_3$ must be t-butyl.

EXAMPLE 8

Utility of a typical compound of the invention, N-(3-isopropylaminopropyl) methacrylamide was demonstrated by using it as a catalyst in the preparation of a flexible polyurethane foam. The following components were used in the formulation.

Parts by Weight

Polyoxypropylene triol,

| | Parts by Weight |
|---|---|
| m.w. 3500 | 100 |
| Water | 4.0 |
| Niax L-520 silicone surfactant | 1.0 |
| F10 catalyst (50% stannous octoate) | 0.6 |
| N-(3-isopropylaminopropyl) methacrylamide | 0.1 |
| Toluene diisocyanate | 48.3 |

All of the above ingredients were stirred rapidly at room temperature as the diisocyanate was quickly poured in. After mixing, the blend was poured into a box. Cream time was 12 seconds and rise time 112 seconds. The resultant foam was of uniform cell structure and had a density of 1.9 pcf.

In addition to the just disclosed utility of the compounds of the invention as polyurethane catalysts, the cationic monomers also find use in additional areas of utility. For example, the cationic monomers, or polymers or copolymers, resulting therefrom may be used as retention aids for fiber furnishes in the paper industry, as additives used for improving drainage through the wire surface of Fourdrinier machine, as additives in cellulosic materials for the purpose of retaining dye added thereto, as polyelectrolytes in the coagulation of low turbidity water, and as additives useful in the flocculation or de-watering of sewage, the settling of coal slurries, the coagulation of rubber latex, and the breaking of oil-in-water emulsions. Likewise, the monomers, homopolymers or copolymers thereof may be used as additives in a number of processes or employed per se to produce a variety of manufactured articles. For example, solutions of resulting polymers may be cast or spun into shaped articles, sheets, films, wrapping tissues, tubing, filaments, yarns, threads, etc. For example, aqueous or alcoholic solutions of polymers made from the cationic monomers described here may be used in coating, finishing casting or molding for adhesion or lamination. Specifically, they may be used as adhesives for cellophane, paper, cloth, etc., as finishes for fabrics, as permanent sizes for yarns, as protective water resistant coverings, for use as sausage casings, as dye intermediates, as filament film formers, etc. The polymers may also find excellent use as anchoring agents for natural and synthetic filaments films and artificial leather. They may also be used to finish and impregnate or coat by surface modification or other manipulative techniques, a number of industrial and commercial articles.

While the invention has been described in connection with specific embodiments thereof, it will be understood that it is capable of further modification, and this application is intended to cover any variations, uses or adaptations of the invention following, in general, the principles of the invention and including such departures as come within known or customary practice in the art to which the invention pertains and as may be applied to the essential features hereinbefore set forth, and as fall within the scope of the invention and the limits of the appended claims.

The invention is hereby claimed as follows:

We claim:

1. A stable N-(ω-monoalkylaminoalkyl) acrylamide or methacrylamide monomer characterized by the following structural formula:

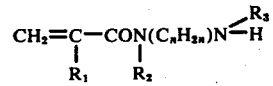

where $R_1$ and $R_2$ are hydrogen or methyl, $R_3$ is isopropyl or t-butyl and $n$ is 2 or 3, with the proviso that when $R_1$ is hydrogen, $R_3$ is t-butyl.

2. The monomer of claim 1 wherein $R_1$ is methyl, $R_2$ is hydrogen, $R_3$ is isopropyl and $n$ is 3.

3. The monomer of claim 1 wherein $R_1$ is methyl, $R_2$ is hydrogen, $R_3$ is t-butyl and $n$ is 3.

4. A method of preparing a stable N-(ω-monoalkylaminoalkyl) acrylamide or methacrylamide monomer characterized by the following structural formula:

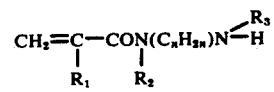

where $R_1$ and $R_2$ are hydrogen or methyl, $R_3$ is isopropyl or t-butyl and $n$ is 2 or 3, with the proviso that when $R_1$ is hydrogen, $R_3$ is t-butyl; which comprises the steps of condensing one mole of an acrylic or methyacrylic compound having the structure:

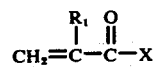

where $R_1$ is hydrogen or methyl and X is selected from the group consisting of halo, OH, or $OR_4$ where $R_4$ is lower alkyl, with a diamine having the structure:

where $R_2$ is hydrogen or methyl, $R_3$ is isopropyl or t-butyl and $n$ is 2 or 3, with the proviso that where $R_1$ is hydrogen, $R_3$ is t-butyl, to provide an intermediate compound having the structure:

where $R_1$, $R_2$, $R_3$, and n have a significance as above defined, and heating said intermediate compound at a sufficient temperature to split off one mole of said diamine reactant to yield said N-(ω-monoalkylaminoalkyl) acrylamide or methacrylamide.

5. The method of claim 4 wherein $R_1$ is methyl, $R_2$ is hydrogen, $R_3$ is isopropyl and $n$ is 3.

6. The method of claim 4 wherein $R_1$ is methyl, $R_2$ is hydrogen, $R_3$ is t-butyl and $n$ is 3.

7. The method of claim 4 wherein said condensation step is carried out at a temperature of 150°–190° C. under pressure.

8. The method of claim 7 wherein said pressure is 1–20 atmospheres.

9. The method of claim 4 wherein said second step of splitting off diamine is carried out at a temperature of 180°–280° C. under vacuum.

10. The method of claim 9 wherein said vacuum reading is 1–75 mm.

11. The method of claim 4 wherein 2–3 moles of diamine are condensed per mole of acrylic or methacrylic compound.